(12) United States Patent
Patel et al.

(10) Patent No.: US 11,609,820 B2
(45) Date of Patent: Mar. 21, 2023

(54) METHOD AND SYSTEM FOR REDUNDANT DISTRIBUTION AND RECONSTRUCTION OF STORAGE METADATA

(71) Applicant: Dell Products L.P., Hopkinton, MA (US)

(72) Inventors: Dharmesh M. Patel, Round Rock, TX (US); Ravikanth Changanti, Bangalore (IN); Rizwan Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 616 days.

(21) Appl. No.: 16/528,595

(22) Filed: Jul. 31, 2019

(65) Prior Publication Data

US 2021/0034468 A1    Feb. 4, 2021

(51) Int. Cl.
*G06F 11/14* (2006.01)
*G06F 3/06* (2006.01)

(52) U.S. Cl.
CPC ........ *G06F 11/1435* (2013.01); *G06F 3/0619* (2013.01); *G06F 3/0641* (2013.01); *G06F 3/0644* (2013.01); *G06F 3/0673* (2013.01)

(58) Field of Classification Search
CPC .. G06F 11/1435; G06F 3/0619; G06F 3/0641; G06F 3/0644; G06F 3/0673
USPC ........................................................ 707/692
See application file for complete search history.

(56) References Cited

U.S. PATENT DOCUMENTS

| | | |
|---|---|---|
| 4,780,809 A | 10/1988 | Woffinden |
| 5,689,678 A | 11/1997 | Stallmo et al. |
| 6,098,098 A | 8/2000 | Sandahl et al. |
| 6,223,252 B1 | 4/2001 | Bandera et al. |
| 6,516,425 B1 | 2/2003 | Belhadj et al. |
| 7,636,814 B1 | 12/2009 | Karr |
| 7,882,386 B1 | 2/2011 | Potnis et al. |
| 7,987,353 B2 | 7/2011 | Holdaway et al. |
| 8,037,345 B1 | 10/2011 | Iyer et al. |
| 8,099,571 B1 | 1/2012 | Driscoll et al. |

(Continued)

FOREIGN PATENT DOCUMENTS

WO    2015114643 A1    8/2015

OTHER PUBLICATIONS

Extended European Search Report issued in corresponding European Application No. 20152195.2, dated Jun. 2, 2020.

(Continued)

*Primary Examiner* — Syed H Hasan
*Assistant Examiner* — Saba Ahmed
(74) *Attorney, Agent, or Firm* — Chamberlain, Hrdlicka, White, Williams & Aughtry

(57) ABSTRACT

In general, the invention relates to a method for managing data, the method includes obtaining data from a host, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, storing the storage metadata in an accelerator pool, storing, across a plurality of fault domains, the plurality of deduplicated data chunks and the at least one parity chunk, and initiating storage metadata distribution on the storage metadata across the plurality of fault domains.

10 Claims, 11 Drawing Sheets

(56) References Cited

U.S. PATENT DOCUMENTS

| | | |
|---|---|---|
| 8,161,255 B2 | 4/2012 | Anglin et al. |
| 8,190,835 B1 | 5/2012 | Yueh |
| 8,364,917 B2 | 1/2013 | Bricker et al. |
| 8,386,930 B2 | 2/2013 | Dillenberger et al. |
| 8,583,769 B1 | 11/2013 | Peters et al. |
| 8,788,466 B2 | 7/2014 | Anglin et al. |
| 8,868,987 B2 | 10/2014 | Wagner |
| 8,874,892 B1 | 10/2014 | Chan et al. |
| 8,898,114 B1 | 11/2014 | Feathergill et al. |
| 8,949,208 B1 | 2/2015 | Xu et al. |
| 9,122,501 B1 | 9/2015 | Hsu et al. |
| 9,201,751 B1 | 12/2015 | Muthirisavenugopal et al. |
| 9,256,381 B1 | 2/2016 | Fultz et al. |
| 9,278,481 B2 | 3/2016 | Hull |
| 9,355,036 B2 | 5/2016 | Beard et al. |
| 9,521,198 B1 | 12/2016 | Agarwala et al. |
| 9,710,367 B1 | 7/2017 | Nagineni |
| 9,749,480 B1 | 8/2017 | Katano |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,013,323 B1 | 7/2018 | Puhov et al. |
| 10,013,325 B1 | 7/2018 | Garrett, Jr. et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,152,254 B1 | 12/2018 | Kang et al. |
| 10,185,624 B2 | 1/2019 | Akutsu |
| 10,241,695 B2 | 3/2019 | Baptist |
| 10,339,455 B1 | 7/2019 | Parush-Tzur et al. |
| 10,409,778 B1 | 9/2019 | Zhao et al. |
| 10,452,301 B1 | 10/2019 | Farhan |
| 10,503,413 B1 | 12/2019 | Gal et al. |
| 10,503,611 B1 | 12/2019 | Srivastav |
| 10,528,429 B1 | 1/2020 | Vempati et al. |
| 10,817,392 B1 | 10/2020 | Mcauliffe et al. |
| 10,929,256 B2 | 2/2021 | Danilov et al. |
| 10,956,601 B2 | 3/2021 | Surla et al. |
| 10,963,345 B2 | 3/2021 | Patel et al. |
| 10,990,480 B1 | 4/2021 | Bernat et al. |
| 11,005,468 B1 | 5/2021 | Subramanian et al. |
| 11,112,990 B1 | 9/2021 | Bernat et al. |
| 2001/0044879 A1 | 11/2001 | Moulton |
| 2003/0036882 A1 | 2/2003 | Harper et al. |
| 2003/0058277 A1 | 3/2003 | Bowman-Amuah |
| 2003/0065873 A1 | 4/2003 | Collins et al. |
| 2003/0172145 A1 | 9/2003 | Nguyen |
| 2003/0177205 A1 | 9/2003 | Liang et al. |
| 2004/0128587 A1 | 7/2004 | Kenchammana-hosekote |
| 2004/0153844 A1 | 8/2004 | Ghose et al. |
| 2004/0260967 A1 | 12/2004 | Guha et al. |
| 2005/0076049 A1 | 4/2005 | Qubti et al. |
| 2005/0086557 A1 | 4/2005 | Sato et al. |
| 2005/0182797 A1 | 8/2005 | Adkins et al. |
| 2005/0262385 A1 | 11/2005 | Mcneill et al. |
| 2005/0283655 A1 | 12/2005 | Ashmore |
| 2007/0214255 A1 | 9/2007 | Spitz et al. |
| 2007/0283011 A1 | 12/2007 | Rakowski et al. |
| 2008/0244204 A1 | 10/2008 | Cremelie et al. |
| 2008/0282105 A1* | 11/2008 | Deenadhayalan .. G06F 11/1076 714/E11.034 |
| 2009/0077165 A1 | 3/2009 | Rhodes et al. |
| 2009/0094250 A1 | 4/2009 | Dhuse |
| 2009/0235022 A1 | 9/2009 | Bates et al. |
| 2009/0254572 A1* | 10/2009 | Redlich ............... G06Q 10/107 |
| 2009/0265360 A1 | 10/2009 | Bachwani |
| 2010/0061207 A1 | 3/2010 | Trantham |
| 2010/0138604 A1 | 6/2010 | Noguchi et al. |
| 2011/0099351 A1 | 4/2011 | Condict |
| 2011/0173484 A1 | 7/2011 | Schuette et al. |
| 2011/0197024 A1 | 8/2011 | Thomas |
| 2011/0246597 A1 | 10/2011 | Swanson et al. |
| 2011/0302446 A1* | 12/2011 | Becker-Szendy ............ G06F 11/1076 714/6.1 |
| 2012/0096309 A1 | 4/2012 | Kumar et al. |
| 2013/0036277 A1 | 2/2013 | Szczepkowski et al. |
| 2013/0047029 A1 | 2/2013 | Ikeuchi et al. |
| 2013/0067459 A1 | 3/2013 | Sannidhanam et al. |
| 2013/0086006 A1 | 4/2013 | Colgrove |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0032834 A1 | 1/2014 | Cudak et al. |
| 2014/0059311 A1 | 2/2014 | Oberhofer et al. |
| 2014/0089265 A1 | 3/2014 | Talagala et al. |
| 2014/0089630 A1 | 3/2014 | Pignatelli |
| 2014/0282824 A1 | 9/2014 | Lango et al. |
| 2014/0285917 A1 | 9/2014 | Cudak et al. |
| 2014/0297603 A1 | 10/2014 | Kim et al. |
| 2015/0012775 A1 | 1/2015 | Cudak et al. |
| 2015/0046756 A1 | 2/2015 | Sreekumaran et al. |
| 2015/0058582 A1 | 2/2015 | Baldwin et al. |
| 2015/0095596 A1 | 4/2015 | Yang |
| 2015/0161000 A1 | 6/2015 | Kim et al. |
| 2015/0205657 A1 | 7/2015 | Clark |
| 2015/0205669 A1 | 7/2015 | Sundaram et al. |
| 2015/0220400 A1 | 8/2015 | Resch |
| 2015/0227602 A1 | 8/2015 | Ramu et al. |
| 2015/0286545 A1 | 10/2015 | Brown |
| 2015/0355980 A1 | 12/2015 | Volvovski |
| 2015/0379430 A1* | 12/2015 | Dirac ................... G06N 20/00 706/12 |
| 2016/0013988 A1 | 1/2016 | Andrews |
| 2016/0062674 A1 | 3/2016 | Benight et al. |
| 2016/0070652 A1 | 3/2016 | Sundararaman et al. |
| 2016/0077933 A1 | 3/2016 | Ventura et al. |
| 2016/0085630 A1 | 3/2016 | Gardner |
| 2016/0246537 A1 | 8/2016 | Kim |
| 2016/0334998 A1* | 11/2016 | George ................ H04L 67/1097 |
| 2017/0090767 A1 | 3/2017 | Poston et al. |
| 2017/0099187 A1 | 4/2017 | Dale et al. |
| 2017/0147437 A1 | 5/2017 | Borlick et al. |
| 2017/0160983 A1 | 6/2017 | Fiske et al. |
| 2017/0192865 A1 | 7/2017 | Pan |
| 2017/0192868 A1 | 7/2017 | Vijayan et al. |
| 2017/0199893 A1 | 7/2017 | Aronovich et al. |
| 2017/0201545 A1 | 7/2017 | Nicodemus et al. |
| 2017/0206034 A1 | 7/2017 | Fetik |
| 2017/0235609 A1 | 8/2017 | Wires et al. |
| 2017/0308436 A1 | 10/2017 | Agombar et al. |
| 2017/0308536 A1 | 10/2017 | Azzam et al. |
| 2018/0018227 A1 | 1/2018 | Kazi |
| 2018/0018235 A1 | 1/2018 | Arslan |
| 2018/0060894 A1 | 3/2018 | Beveridge et al. |
| 2018/0101305 A1 | 4/2018 | Kazi et al. |
| 2018/0157532 A1 | 6/2018 | Kumar et al. |
| 2018/0165169 A1 | 6/2018 | Camp et al. |
| 2018/0173730 A1 | 6/2018 | Copenhaver et al. |
| 2018/0189109 A1 | 7/2018 | Nagai et al. |
| 2018/0205785 A1 | 7/2018 | Caulfield et al. |
| 2018/0217898 A1 | 8/2018 | Tormasov et al. |
| 2018/0260123 A1 | 9/2018 | Andresen et al. |
| 2018/0278597 A1 | 9/2018 | Helms et al. |
| 2018/0284987 A1 | 10/2018 | Lazier |
| 2018/0307560 A1 | 10/2018 | Vishnumolakala et al. |
| 2018/0314607 A1 | 11/2018 | Deshpande et al. |
| 2018/0322558 A1 | 11/2018 | Padmanabh et al. |
| 2018/0356998 A1 | 12/2018 | Wu et al. |
| 2019/0050263 A1 | 2/2019 | Patel et al. |
| 2019/0104398 A1 | 4/2019 | Owen et al. |
| 2019/0108099 A1 | 4/2019 | Mazumdar |
| 2019/0109772 A1 | 4/2019 | Lipstone et al. |
| 2019/0188079 A1 | 6/2019 | Kohli |
| 2019/0197023 A1 | 6/2019 | Chennamsetty et al. |
| 2019/0332473 A1 | 10/2019 | Yang et al. |
| 2019/0332502 A1 | 10/2019 | Ma et al. |
| 2019/0361850 A1 | 11/2019 | Uno et al. |
| 2019/0379588 A1 | 12/2019 | Rao |
| 2020/0026439 A1 | 1/2020 | Gao et al. |
| 2020/0034257 A1 | 1/2020 | Mahmood et al. |

(56) References Cited

U.S. PATENT DOCUMENTS

| | | |
|---|---|---|
| 2020/0042388 A1 | 2/2020 | Roberts |
| 2020/0050689 A1 | 2/2020 | Tal et al. |
| 2020/0065191 A1 | 2/2020 | Zhou |
| 2020/0133503 A1 | 4/2020 | Sun et al. |
| 2020/0175038 A1 | 6/2020 | Guan et al. |
| 2020/0201837 A1 | 6/2020 | Motwani et al. |
| 2020/0257457 A1 | 8/2020 | Matsugami et al. |

OTHER PUBLICATIONS

Suzhen Wu et al. ;"Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028).

"Features—RoboHead"; Project Management Software for Marketing & Creative Teams, Aquent; 2018 (https://www.robohead.net/features) (2 pages).

"Make more time for the work that matters most"; Asana, Inc.; 2017 (https://asana.com/) (5 pages).

"Online Project Management Tools & Features"; ProWorkflow; Jun. 2015 (https://www.proworkflow.com/features-project-management-tools/) (7 pages).

\* cited by examiner

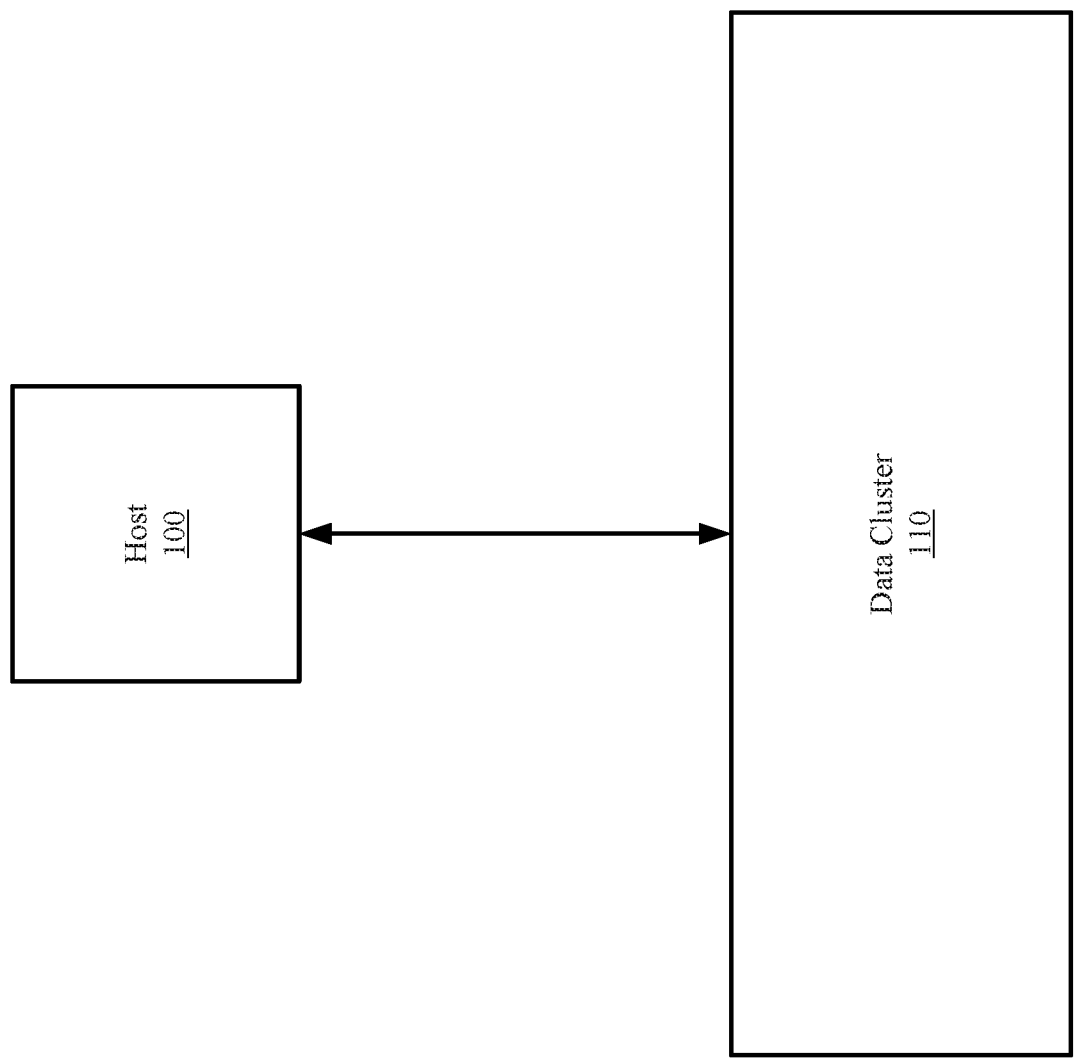

METHOD AND SYSTEM FOR REDUNDANT DISTRIBUTION AND RECONSTRUCTION OF STORAGE METADATA

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, the invention relates to a method for managing data. The method includes obtaining data from a host, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, storing the storage metadata in an accelerator pool, storing, across a plurality of fault domains, the plurality of deduplicated data chunks and the at least one parity chunk, and initiating storage metadata distribution on the storage metadata across the plurality of fault domains.

In general, the invention relates to a non-transitory computer readable medium which includes computer readable program code, which when executed by a computer processor enables the computer processor to perform a method for managing data. The method includes obtaining data from a host, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, storing the storage metadata in an accelerator pool, storing, across a plurality of fault domains, the plurality of deduplicated data chunks and the at least one parity chunk, and initiating storage metadata distribution on the storage metadata across the plurality of fault domains.

In general, the invention relates to a system comprising a host and data nodes. A data node of the data nodes includes a processor and memory comprising instructions, which when executed by the processor perform a method for managing data. The method includes obtaining data from a host, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, storing the storage metadata in an accelerator pool, storing, across a plurality of fault domains, the plurality of deduplicated data chunks and the at least one parity chunk, and initiating storage metadata distribution on the storage metadata across the plurality of fault domains.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1A shows a diagram of a system in accordance with one or more embodiments of the invention.

DETAILED DESCRIPTION

Figure 1B:
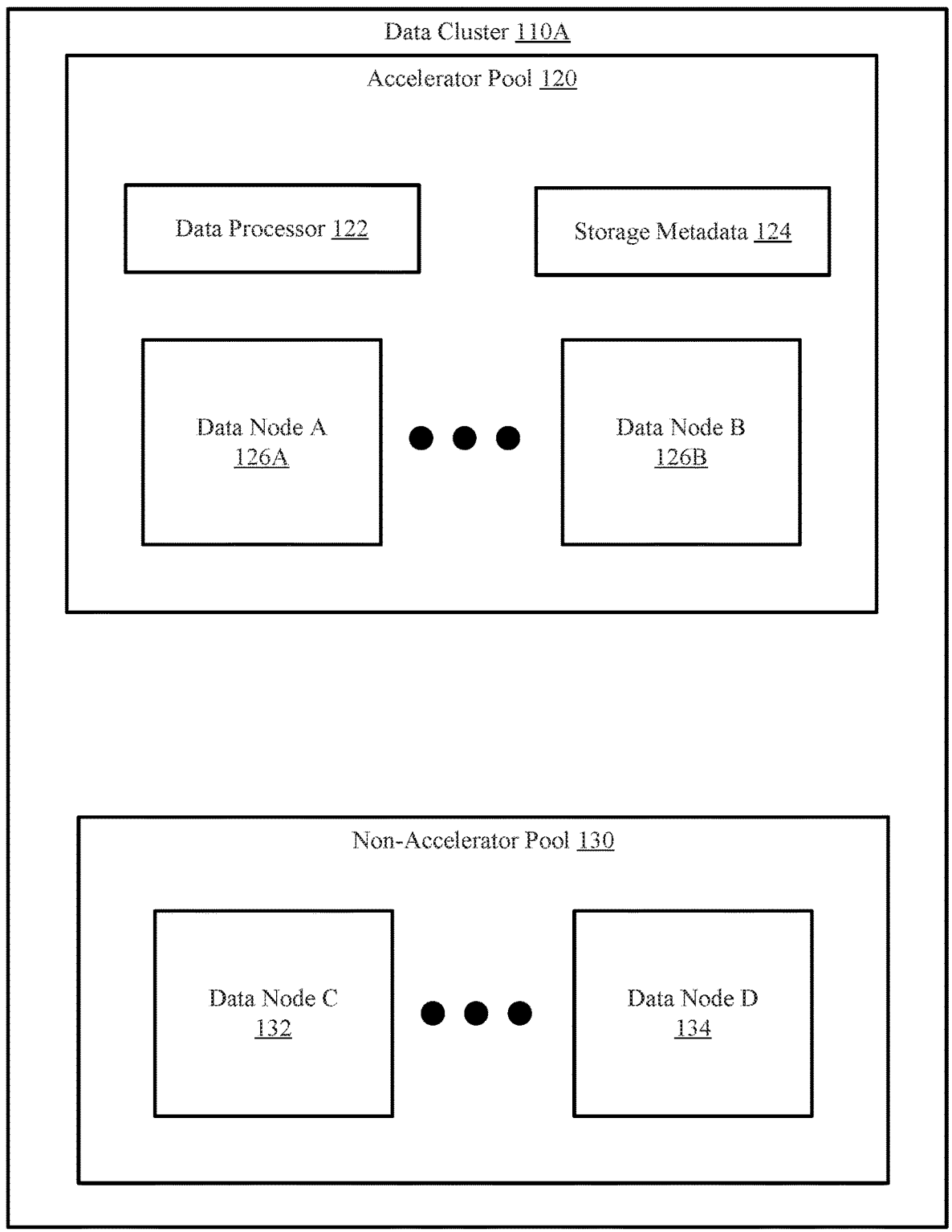
FIG. 1B shows a diagram of a data cluster in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data and metadata in a data cluster. Embodiments of the invention may utilize a data processor, operating in an accelerator pool, which applies an erasure coding procedure on data obtained from a host to divide the data into data chunks and to generate parity chunks using the data chunks. The data processor may then perform deduplication on the data chunks to generate deduplicated data that includes deduplicated data chunks. The deduplicated data chunks and the parity chunks may be subsequently distributed to nodes in the data cluster in accordance with an erasure coding procedure.

In one or more embodiments of the invention, the accelerator pool stores storage metadata that specifies the nodes in which each data chunk and parity chunk is stored. The storage metadata may also be distributed to nodes in the non-accelerator pool. In this manner, if the storage metadata stored in the accelerator pool becomes unavailable, the storage metadata may be reconstructed using the storage metadata stored in the non-accelerator pool.

FIG. 1A shows an example system in accordance with one or more embodiments of the invention. The system includes a host (100) and a data cluster (110). The host (100) is operably connected to the data cluster (110) via any combination of wired and/or wireless connections.

In one or more embodiments of the invention, the host (100) utilizes the data cluster (110) to store data. The data stored may be backups of databases, files, applications, and/or other types of data without departing from the invention.

Figure 5:
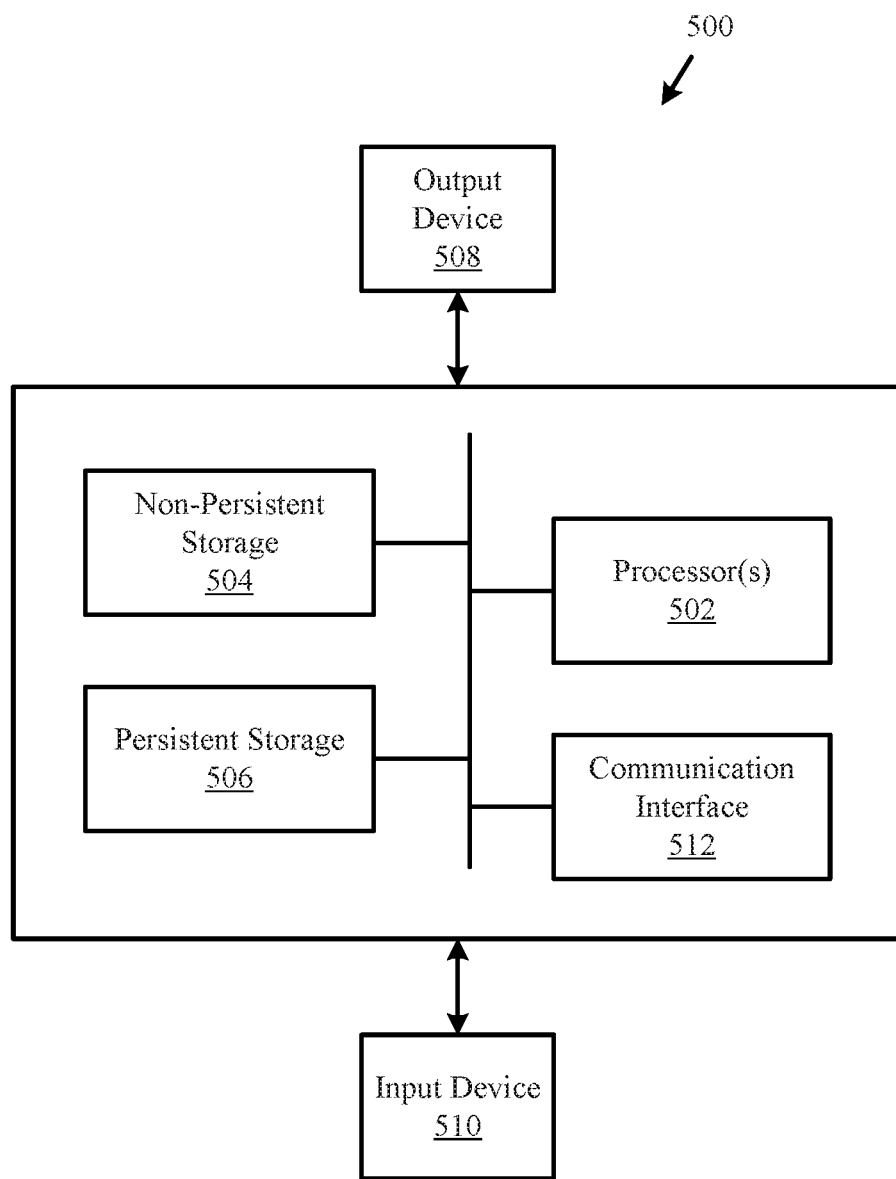
FIG. 5 shows a diagram of a computing device in accordance with one or more embodiments of the invention.

In one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data, metadata, and/or backups of data generated by the host (100). The data and/or backups may be deduplicated versions of data obtained from the host. The data cluster may, via an erasure coding procedure, store portions of the deduplicated data across nodes operating in the data cluster (110).

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version.

Continuing with the discussion of FIG. 1A, the data cluster (110) may include nodes that each store any number of portions of data. The portions of data may be obtained by other nodes or obtained from the host (100). For additional details regarding the data cluster (110), see, e.g., FIG. 1B.

FIG. 1B shows a diagram of a data cluster (110A) in accordance with one or more embodiments of the invention. The data cluster (110A) may be an embodiment of the data cluster (110, FIG. 1A) discussed above. The data cluster (110A) may include an accelerator pool (120) and a non-accelerator pool (130). The accelerator pool (120) may include a data processor (122) and any number of data nodes (126A, 126B). Similarly, the non-accelerator pool (130) includes any number of data nodes (132, 134). The components of the data cluster (110A) may be operably connected via any combination of wired and/or wireless connections. Each of the aforementioned components is discussed below.

In one or more embodiments of the invention, the data processor (122) is a device that includes functionality to perform deduplication on data obtained from a host (e.g., 100, FIG. 1A). The data processor (122) may generate, utilize, and update storage metadata (124) (as described in FIG. 2) as part of its deduplication functionality. In one or more embodiments of the invention, the storage metadata (124) is a data structure that stores unique identifiers of portions data stored in the data cluster (110A). The unique identifiers stored in the storage metadata (124) may be used to determine whether a data chunk of the obtained data is already present elsewhere in the accelerator pool (120) or the non-accelerator pool (130). The data processor (122) may use the storage information to perform the deduplication and generate deduplicated data. After deduplication, an erasure coding procedure may be performed on the deduplicated data in order to generate parity chunks. The data processor (122) may perform the deduplication and erasure coding procedure via the method illustrated in FIG. 3A.

In one or more embodiments of the invention, the storage metadata (124) is stored in a data node (126A, 126B) of the accelerator pool (120). A copy of the storage metadata (124) may be distributed to one or more data nodes (132, 134) of the non-accelerator pool (130). In this manner, if the storage metadata (124) stored in the accelerator pool (120) experiences a failure (e.g., it becomes unavailable, corrupted, etc.), the storage metadata (124) may be reconstructed using the copies of storage metadata stored in the non-accelerator pool (130). For additional detail regarding the distribution on storage metadata, see e.g., FIG. 3A.

Figure 3A:
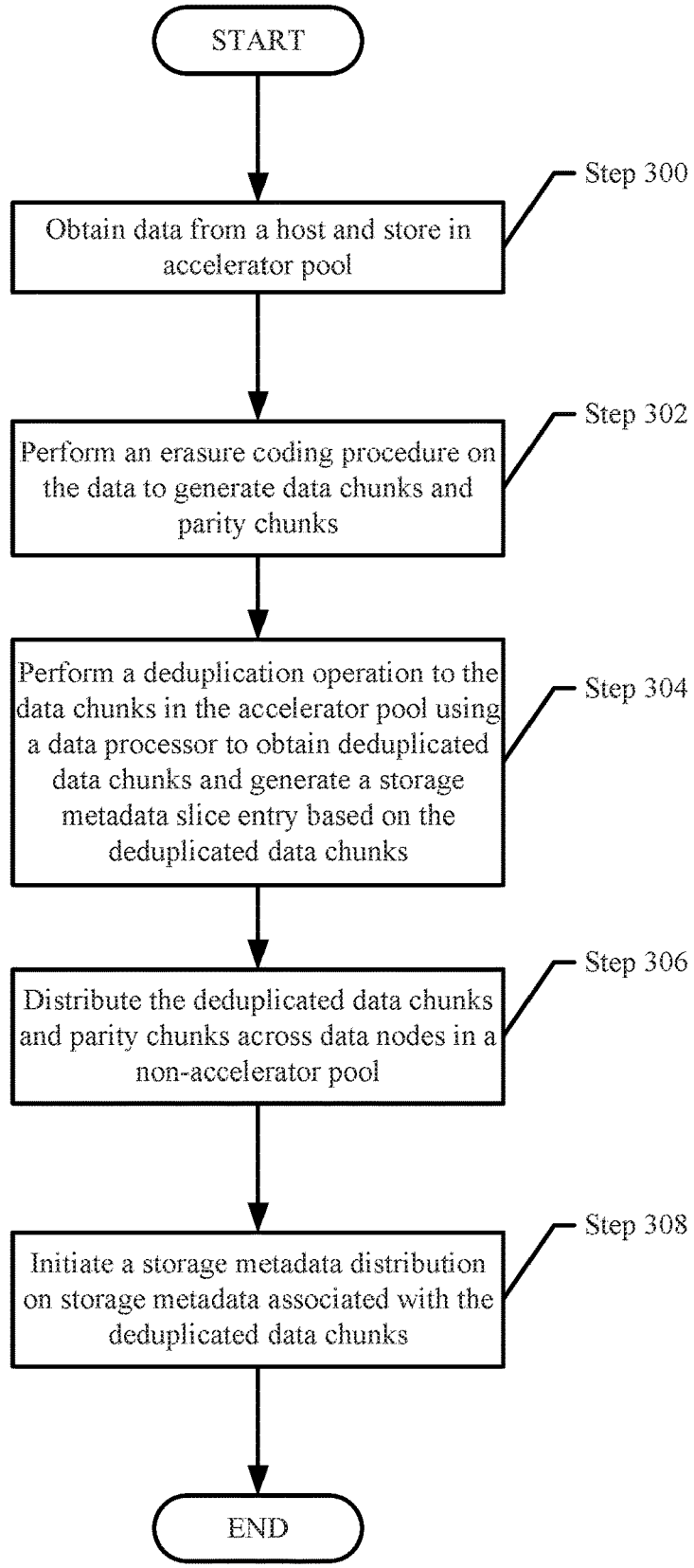
FIG. 3A shows a flowchart for storing data in a data cluster in accordance with one or more embodiments of the invention.

In one or more of embodiments of the invention, the data processor (122) is implemented as computer instructions, e.g., computer code, stored on a persistent storage that when executed by a processor of a data node (e.g., 126A, 126B) of the accelerator pool (120) cause the data node to provide the aforementioned functionality of the data processor (122) described throughout this application and/or all, or a portion thereof, of the method illustrated in FIG. 3A.

In one or more embodiments of the invention, the data processor (122) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (122) described throughout this application and/or all, or a portion thereof, of the method illustrated in FIG. 3A.

In one or more embodiments of the invention, the data processor (122) is implemented as a logical device. The logical device may utilize the computing resources of any number of computing devices and thereby provide the functionality of the data processor (122) described throughout this application and/or all, or a portion thereof, of the method illustrated in FIG. 3A.

Continuing with the discussion of FIG. 1B, different data nodes in the cluster may include different quantities and/or types of computing resources, e.g., processors providing processing resources, memory providing memory resources, storages providing storage resources, communicators providing communications resources. Thus, the system may include a heterogeneous population of nodes.

The heterogeneous population of nodes may be logically divided into: (i) an accelerator pool (120) including nodes that have more computing resources, e.g., high performance nodes (126A, 126B), than other nodes and (ii) a non-accelerator pool (130) including nodes that have fewer computing resources, e.g., low performance nodes (132, 134) than the nodes in the accelerator pool (120). For example, nodes of the accelerator pool (120) may include enterprise-class solid state storage resources that provide very high storage bandwidth, low latency, and high input-outputs per second (IOPS). In contrast, the nodes of the non-accelerator pool (130) may include hard disk drives that provide lower storage performance. While illustrated in FIG. 1B as being divided into two groups, the nodes may be divided into any number of groupings based on the relative performance level of each node without departing from the invention.

In one or more embodiments of the invention, the data nodes (126A, 126B, 132, 134) store data chunks and parity chunks along with storage metadata (as described below). The data nodes (126A, 126B, 132, 134) may include persistent storage that may be used to store the data chunks, parity chunks and storage metadata. The generation of the data chunks and parity chunks as well as the storage metadata is described below with respect to FIG. 3A. For additional details regarding the data nodes (126A, 126B, 132, 134), see, e.g., FIG. 1C.

In one or more embodiments of the invention, the non-accelerator pool (130) includes any number of fault domains. In one or more embodiments of the invention, a fault domain is a logical grouping of nodes (e.g., data nodes) that, when one node of the logical grouping of nodes goes offline and/or otherwise becomes inaccessible, the other nodes in the same logical grouping of nodes are directly affected. However, nodes in a different fault domain may be unaffected. For additional details regarding fault domains, see, e.g. FIG. 1E.

In one or more embodiments of the invention, each data node (126A, 126B, 132, 134) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data node (126A, 126B, 132, 134) described throughout this application and/or all, or a portion thereof, of the method illustrated in FIGS. 3A-3B.

In one or more embodiments of the invention, each of the data nodes (126A, 126B, 132, 134) is implemented as a logical device. The logical device may utilize the computing resources of any number of computing devices and thereby provide the functionality of the data nodes (126A, 126B, 132, 134) described throughout this application and/or all, or a portion thereof, of the method illustrated in FIGS. 3A-3B. For additional details regarding the data nodes (126A, 126B, 132, 134), see, e.g., FIG. 1C.

Figure 1C:
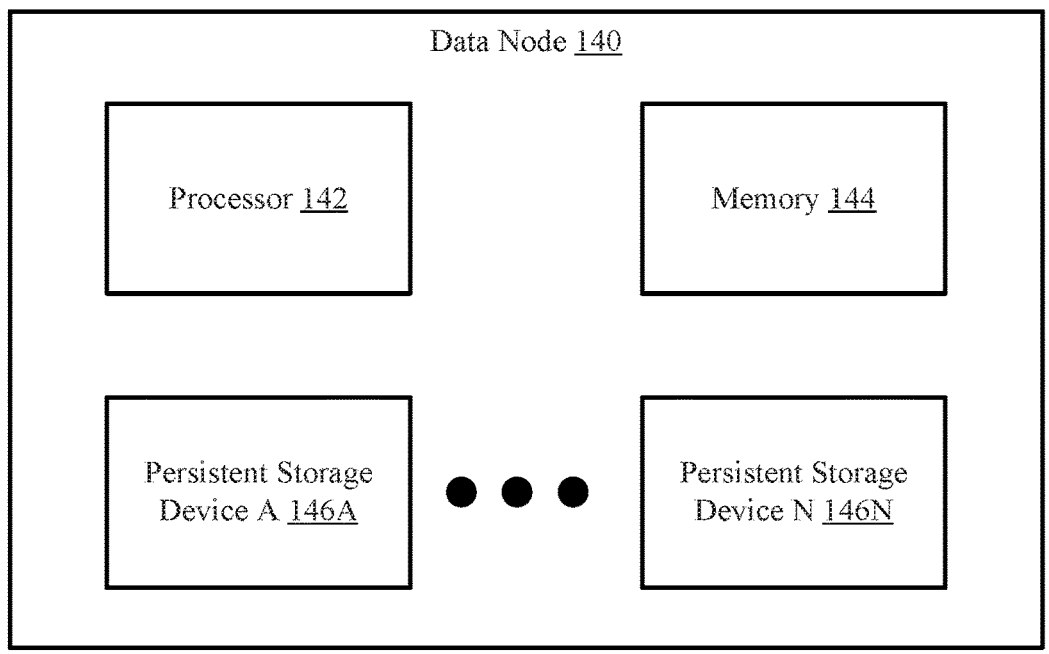
FIG. 1C shows a diagram of a data node in accordance with one or more embodiments of the invention.

FIG. 1C shows a diagram of a data node (140) in accordance with one or more embodiments of the invention. The data node (140) may be an embodiment of a data node (126A, 126B, 132, 134, FIG. 1B) discussed above. Each data node may be equipped with a processor (142), memory (144), and one or more persistent storage devices (146A, 146N). Each component of the data node (140) may be operatively connected to each other via wired and/or wireless connections. The data node (140) may have additional, fewer, and/or different components without departing from the invention. Each of the illustrated components of the data node (140) is discussed below.

In one or more embodiments of the invention, the processor (142) is a component that processes data and processes of requests. The processor (142) may be, for example, a central processing unit (CPU). The processor may process a request to rebuild data and/or metadata using data stored in memory (144) and/or the persistent storage devices (146A, 146N). The processor (142) may process other requests without departing from the invention.

In one or more embodiments of the invention, the data node includes memory (144) which stores data that is more accessible to the processor (142) than the persistent storage devices (146A, 146N). The memory (144) may be volatile storage. Volatile storage may be storage that stores data that is lost when the storage loses power. The memory may be, for example, Random Access Memory (RAM). In one or more embodiments of the invention, a copy of the storage metadata discussed in FIG. 1B is stored in the memory (144) of the data node (140).

In one or more embodiments of the invention, the persistent storage devices (146A, 146N) store data. The data may be data chunks and/or parity chunks. In addition, the data may also include storage metadata. The persistent storage devices (146A, 146N) may be non-volatile storage. In other words, the data stored in the persistent storage devices (146A, 146N) is not lost or removed when the persistent storage devices (146A, 146N) lose power. Each of the persistent storage devices (146A, 146N) may be, for example, solid state drives, hard disk drives, and/or tape drives. The persistent storage devices may include other types of non-volatile or non-transitory storage mediums without departing from the invention. For additional details regarding the persistent storage devices, see, e.g., FIG. 1D.

Figure 1D:
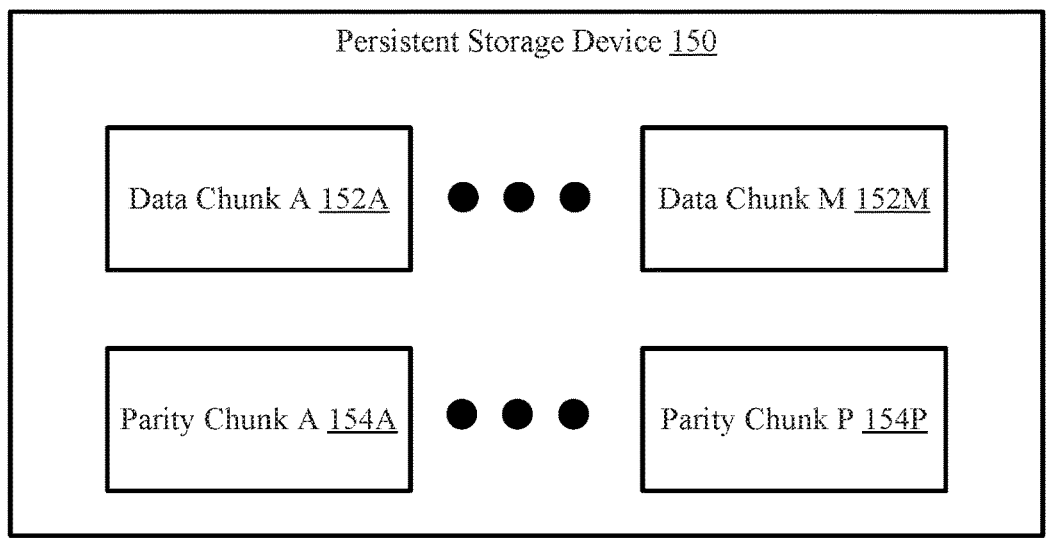
FIG. 1D shows a diagram of persistent storage in accordance with one or more embodiments of the invention.

FIG. 1D shows a diagram of a persistent storage device. The persistent storage device (150) may be an embodiment of a persistent storage device (146A, 146N) discussed above. As discussed above, the persistent storage device (150) stores data. The data may be data chunks (152A, 152M) and parity chunks (154A, 154P). Though not shown in FIG. 1D, the data may also include storage metadata In one or more embodiments of the invention, a data chunk (152A, 152M) is a data structure that includes a portion of data that was obtained from a host. The data chunks (152A, 152M) may be deduplicated by a data processor and obtained by the data node (140) from the data processor. Each of the data chunks (152A, 152M) may be used by the data node (140) (or another data node) to reconstruct another data chunk or a parity chunk based on an erasure coding algorithm that was applied to the other data chunk or parity chunk.

In one or more embodiments of the invention, a parity chunk (154A, 154P) is a data structure that includes a parity value generated using an erasure coding algorithm. The parity value may be generated by applying the erasure coding algorithm to one or more data chunks stored in the data node (140) or other data nodes. Each of the parity chunks (154A, 154P) may be used by the data node (140) (or another data node) to reconstruct another parity chunk or a data chunk based on an erasure coding algorithm that was applied to the other parity chunk or data chunk.

Figure 1E:
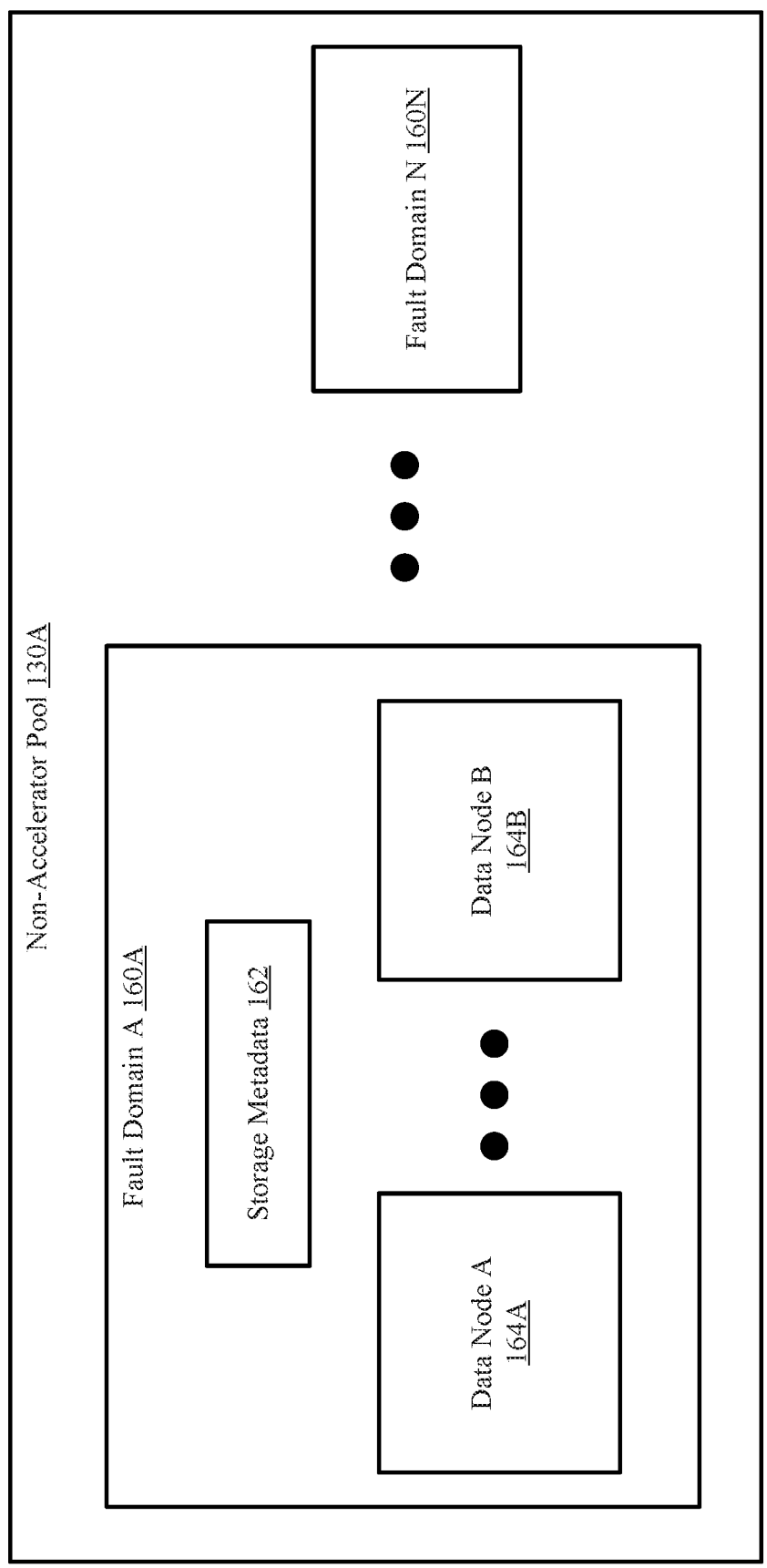
FIG. 1E shows a diagram of a non-accelerator pool in accordance with one or more embodiments of the invention.

FIG. 1E shows a diagram of a non-accelerator pool in accordance with one or more embodiments of the invention. The non-accelerator pool (130A) is an embodiment of the non-accelerator pool (130, FIG. 1B) discussed above. The non-accelerator pool (130A) may include any number of fault domains (160A, 160N).

As discussed above, a fault domain (160A, 160N) is a logical grouping of data nodes (164A, 164B) that, when one data node of the logical grouping of data nodes goes offline and/or otherwise becomes inaccessible, the other nodes in the logical grouping of nodes are directly affected. The effect of the node going offline to the other nodes may include the other nodes also going offline and/or otherwise inaccessible. The non-accelerator pool (130) may include multiple fault domains. In this manner, the events of one fault domain in the non-accelerator pool (130) may have no effect to other fault domains in the non-accelerator pool (130).

For example, two data nodes may be in a first fault domain (e.g., 160A). If one of these data nodes in the first fault domain (160A) experiences an unexpected shutdown, other nodes in the first fault domain may be affected. In contrast, another data node in a second fault domain may not be affected by the unexpected shutdown of a data node in the first fault domain. In one or more embodiments of the invention, the unexpected shutdown of one fault domain does not affect the nodes of other fault domains. In this manner, data may be replicated and stored across multiple fault domains to allow high availability of the data.

As discussed above, the data chunks and parity chunks of a data slice (e.g., generated using the erasure coding described in FIG. 3A) may be stored in different fault domains (160A, 160N). Storing the data chunks and parity chunks in multiple fault domains may be for recovery purposes. In the event that one or more fault domains storing data chunks or parity chunks become inaccessible, the data chunks and/or parity chunks stored in the remaining fault domains may be used to recreate the inaccessible data. In one embodiment of the invention, as part of (or in addition to) the chunk metadata, the storage metadata (162) tracks the members of each data slice (i.e., which data chunks and which parity chunks are part of a data slice). This information may be used to aid in any recover operation that is required to be performed on the data stored in the data cluster.

In one or more embodiments of the invention, each fault domain (160A, 160N) stores a copy of storage metadata (162) obtained from a non-accelerator pool and/or from another fault domain (160A, 160N) distributing a copy of the storage metadata. The copy of storage metadata (162) in a fault domain may be stored in one or more data nodes (164A, 164B) of the fault domain. The copy of storage metadata (162) may be stored in any other computing device associated with the fault domain without departing from the invention.

Figure 2:
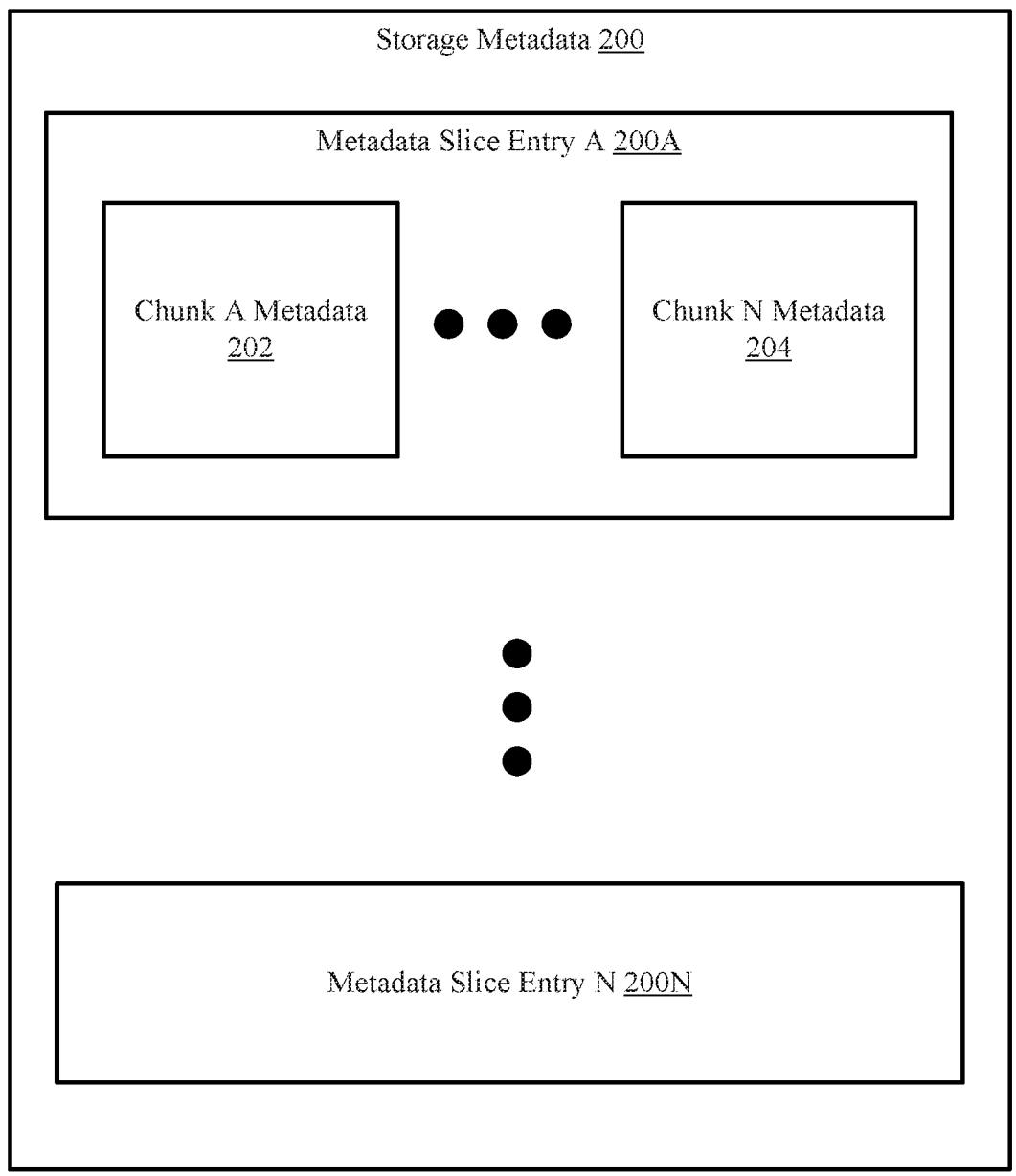
FIG. 2 shows a diagram of storage metadata in accordance with one or more embodiments of the invention.

FIG. 2 shows a diagram of storage metadata in accordance with one or more embodiments of the invention. The storage metadata (200) may be an embodiment of the storage metadata (124, FIG. 1B; 162, FIG. 1E) discussed above. As discussed above, the storage metadata (200) stores information about data chunks or parity chunks (collectively, chunks). The storage information may include one or more metadata slice entries (200A, 200N). Each metadata slice entry (200A, 200N) may include chunk metadata (202, 204). Each of the aforementioned portions of the storage metadata (200) is discussed below.

In one or more embodiments of the invention, a metadata slice entry (200A, 200N) is an entry that specifies metadata associated with chunks of a data slice. The metadata slice entry (200A, 200N) includes chunk metadata (202, 204). Each chunk of a chunk metadata (202, 204) may correspond to metadata for a data chunk or a parity chunk. Each chunk metadata (202, 204) may include information about a chunk such as, for example, a unique identifier (e.g., a fingerprint) and a storage location of the chunk, e.g., the non-accelerator pool. The unique identifier of a chunk may be generated using the chunk (e.g., calculated using the data of the chunk).

FIG. 3A shows a flowchart for storing data in a data cluster in accordance with one or more embodiments of the invention. The method shown in FIG. 3A may be performed by, for example, a data processor (122, FIG. 1B). Other components of the system illustrated in FIG. 1B may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, data is obtained from a host. The data may be a file, a file segment, a collection of files, or any other type of data without departing from the invention.

In step 302, an erasure coding procedure is performed on the data to generate data chunks and parity chunks. In one or more embodiments of the invention, the erasure coding procedure includes dividing the obtained data into portions, referred to as data chunks. Each data chunk may include any number of data segments associated with the obtained data. The individual data chunks may then be combined (or otherwise grouped) into slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. Non-limiting examples of erasure coding algorithms are RAID-3, RAID-4, RAID-5, and RAID-6. Other erasing coding algorithms may be used without departing from the invention. Continuing with the above discussion, if the erasing code procedure is implementing RAID-3, then a single parity value is calculated. The resulting parity value is then stored in a parity chunk. If erasure coding procedure algorithm requires multiple parity values to be calculated, then the multiple parity values are calculated with each parity value being stored in a separate data chunk.

As discussed above, the data chunks are used to generate parity chunks in accordance with the erasure coding procedure. More specifically, the parity chunks may be generated by applying a predetermined function (e.g., P Parity function, Q Parity Function), operation, or calculation to at least one of the data chunks. Depending on the erasure coding procedure used, the parity chunks may include, but are not limited to, P parity values and/or Q parity values.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q = g_0 \cdot D_0 + g_1 \cdot D_1 + g_2 \cdot D_2 + \ldots + g_{n-1} \cdot D_{n-1}$, where Q corresponds to the Q parity, g is a generator of the field, and the value of D corresponds to the data in the data chunks.

In one or more embodiments of the invention, the number of data chunks and parity chunks generated is determined by the erasure coding procedure, which may be specified by the host, by the data cluster, and/or by another entity.

In step 304, deduplication is performed on the data chunks to obtain deduplicated data chunks. Additionally, a storage metadata slice entry is generated based on the deduplication data chunks and the parity chunks. In one or more embodiments of the invention, the deduplication is performed in the accelerator pool by identifying the data chunks of the obtained data and assigning a fingerprint to each data chunk. A fingerprint is a unique identifier that may be stored in metadata of the data chunk. The data processor performing the deduplication may generate a fingerprint for a data chunk and identify whether the fingerprint matches an existing fingerprint stored in storage metadata stored in the accelerator pool. If the fingerprint matches an existing fingerprint, the data chunk may be deleted, as it is already stored in the data cluster. If the fingerprint does not match any existing fingerprints, the data chunk may be stored as a deduplicated data chunk. Additionally, the fingerprint of each deduplicated data chunk is stored in a storage metadata slice entry of the storage metadata. A fingerprint (or other unique identifier) of each parity chunk is also generated and stored in the storage metadata slice entry.

In one or more embodiments of the invention, the deduplicated data chunks collectively make up the deduplicated data. In one or more embodiments of the invention, the deduplicated data chunks are the data chunks that were not deleted during deduplication.

In step 306, the deduplicated data chunks and parity chunk(s) are stored across data nodes in different fault domains in a non-accelerator pool. As discussed above, the deduplicated data chunks and the parity chunk(s) are stored in a manner that minimizes reads and writes from the non-accelerator pool. In one embodiment of the invention, this minimization is achieved by storing data chunks and parity chunks, which are collective referred to as a data slice (or slice), in the same manner as a prior version of the data slice. The data processor may use, as appropriate, storage metadata for the previously stored data chunks and parity chunks to determine where to store the data chunks and parity chunks in step 306.

More specifically, in one embodiment of the invention, if the deduplicated data chunks and parity chunks are the first version of a data slice (as opposed to a modification to an existing/previously stored data slice), then the deduplicated data chunks and parity chunks may be stored across the data nodes (each in a different fault domain) in the non-accelerator pool. The location in which the data chunk or parity chunk is stored is tracked using the storage metadata. The scenario does not require the data processor to use location information for previously stored data chunks and parity chunks.

However, if the deduplicated data chunks and parity chunks are the second version of a slice (e.g., a modification to a previously stored slice), then the deduplicated data chunks and parity chunks are stored across the nodes (each in a different fault domain) in the non-accelerator pool using prior stored location information. The information about the location in which the data chunk or parity chunk for the second version of the slice is stored in the storage metadata.

For example, consider a scenario in which the first version of the slice includes three data chunks (D1, D2, D3) and one parity chunk (P1) that were stored as follows: Data Node 1 stores D1, Data Node 2 stores D2, Data Node 3 stores D3, and Data Node 4 stores P1. Further, in this example, a second version of the slice is received that includes three data chunks (D1, D2', D3) and one newly calculated parity chunk (P1'). After deduplication only D2' and P1' need to be stored. Based on the prior storage locations (also referred to as locations) of the data chunks (D1, D2, and D3) and parity chunks (P1) for the first version of the slice, D2' is stored on Node 2 and P1' is stored on Node 4. By storing the D2' on Node 2 and P1' on Node 4 the data chunks and parity chunks associated with the second slice satisfy the condition that all data chunks and parity chunks for the second version of the slice are being stored in separate fault domains. If the location information was not taken into account, then the entire slice (i.e., D1, D2', D3, and P1') would need to be stored in order to guarantee that the requirement that all data chunks and parity chunks for the second version of the slice are being stored in separate fault domains is satisfied.

In one or more embodiments of the invention, if the data node that obtains the deduplicated data chunk, which is a modified version of a prior stored deduplicated data chunk, then the data node may: (i) store the modified version of the deduplicated data chunk (i.e., the data node would include two versions of the data chunk) or (ii) store the modified version of the deduplicated data chunk and delete the prior version of the deduplicated data chunk.

In one embodiment of the invention, the data processor includes functionality to determine whether a given data chunk is a modified version of a previously stored data chunk. Said another way, after the data is received from a host divided into data chunks and grouped into slices, the data processor includes functionality to determine whether a slice is a modified version of a prior stored slice. The data processor may use the fingerprints of the data chunks within the slice to determine whether the slice is a modified version of a prior stored slice. Other methods for determining whether a data chunk is a modified version of a prior stored data chunk and/or whether a slice is a modified version of a prior slice without departing from the invention.

In step 308, a storage metadata distribution on storage metadata is initiated. In one or more embodiments of the invention, the storage metadata is distributed by generating a copy of the storage metadata that includes the storage metadata slice entry generated in step 304 and sending the copy of storage metadata in the non-accelerator pool.

In one or more embodiments of the invention, the copy of storage metadata is sent to a data node of a fault domain by the data processor. The data processor may further instruct the data node to distribute the copy of storage metadata to other data nodes in the fault domain or to other data nodes in other fault domains. In this manner, a copy of the storage metadata is stored in multiple fault domains in the event of a storage metadata failure.

In one or more embodiments of the invention, the copy of storage metadata is sent to multiple fault domains by the data processor. The data processor may send a copy of storage metadata to one or more data nodes of each of the multiple fault domains. In this manner, a copy of the storage metadata is stored in multiple fault domains in the event of a storage metadata failure.

While FIG. 3A describes erasure coding and deduplicating the data, embodiments of the invention may be implemented where the data is only erasure coded and not deduplicated. In such embodiments, step 304 includes generating a storage metadata slice using non-deduplicated data chunks and parity chunks and step 306 includes distributing non-deduplicated data chunks and parity chunks.

Figure 3B:
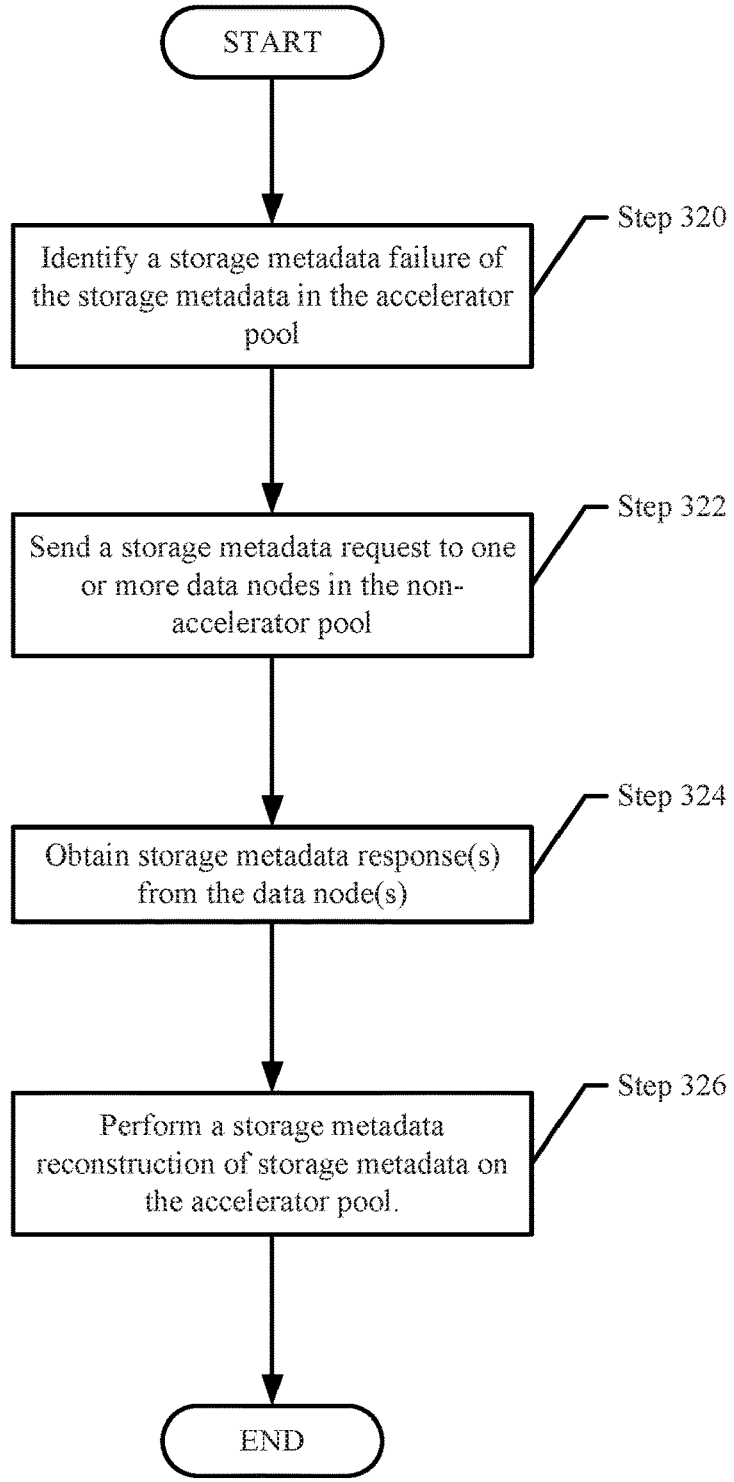
FIG. 3B shows a flowchart for managing a storage metadata failure in accordance with one or more embodiments of the invention.

FIG. 3B shows a flowchart for storing data in a data cluster in accordance with one or more embodiments of the invention. The method shown in FIG. 3B may be performed by, for example, a data processor (122, FIG. 1B). Other components of the system illustrated in FIG. 1B may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320, a storage metadata failure is identified in the accelerator pool. In one or more embodiments of the invention, the storage metadata failure is identified by: (i) attempting to access the storage metadata and identifying a corruption in the storage metadata and/or (ii) not being able to access the storage metadata. In one or more embodiments of the invention, if the storage metadata is stored in a different computing device from that in which the data processor is executing, the data processor may identify the storage metadata failure by receiving an error message from the computing device storing the storage metadata.

In step 322, a storage metadata request is sent to one or more data nodes in the non-accelerator pool, which may be in the same and/or different fault domains. The storage metadata request(s) may specify the storage metadata or portion of storage metadata that is to be obtained from the data node(s).

For example, in one or more embodiments of the invention, if the data processor sends storage metadata requests to multiple data nodes, each storage metadata request specifies a portion of the storage metadata associated with data stored in each respective fault domain. For example, a first storage metadata request sent to a first fault domain may specify storage metadata associated with data stored in the first fault domain, a second storage metadata request sent to a second fault domain may specify storage metadata associated with data stored in the second fault domain, etc.

For example, in another embodiment, because each fault domain includes a complete copy of the storage metadata, each of the storage metadata requests may specify a subset of the metadata slice entries. For example, if there are four fault domains (A-D) and eight metadata slice entries (SE1-SE8), then data processor may issue the following storage metadata requests: (i) storage metadata request to a data node in fault domain A for SE1, SE2; (ii) storage metadata request to a data node in fault domain B for SE3, SE4; (iii) a storage metadata request to data node in fault domain C for SE5, SE6; and (iv) storage metadata request to a data node in fault domain D for SE7, SE8.

In step 324, one or more storage metadata responses are obtained from the data node(s). In one or more embodiments of the invention, each data node that obtained a storage metadata request sends back a storage metadata response. The storage metadata response may include the storage metadata (or a portion of the storage metadata) as requested by the data processor.

In step 326, a storage metadata reconstruction is performed on the storage metadata in the accelerator pool. In one or more embodiments of the invention, if the data processor obtains multiple portions of the storage metadata, the data processor combines the portions to generate a storage metadata that specifies all of the metadata slice entries specified by each of the portions of storage metadata.

In one or more embodiments of the invention, if the data processor obtains a storage metadata response that includes a copy of the storage metadata, the reconstruction is not necessary and the copy of storage metadata is stored in the accelerator pool.

Example

Figure 4A:
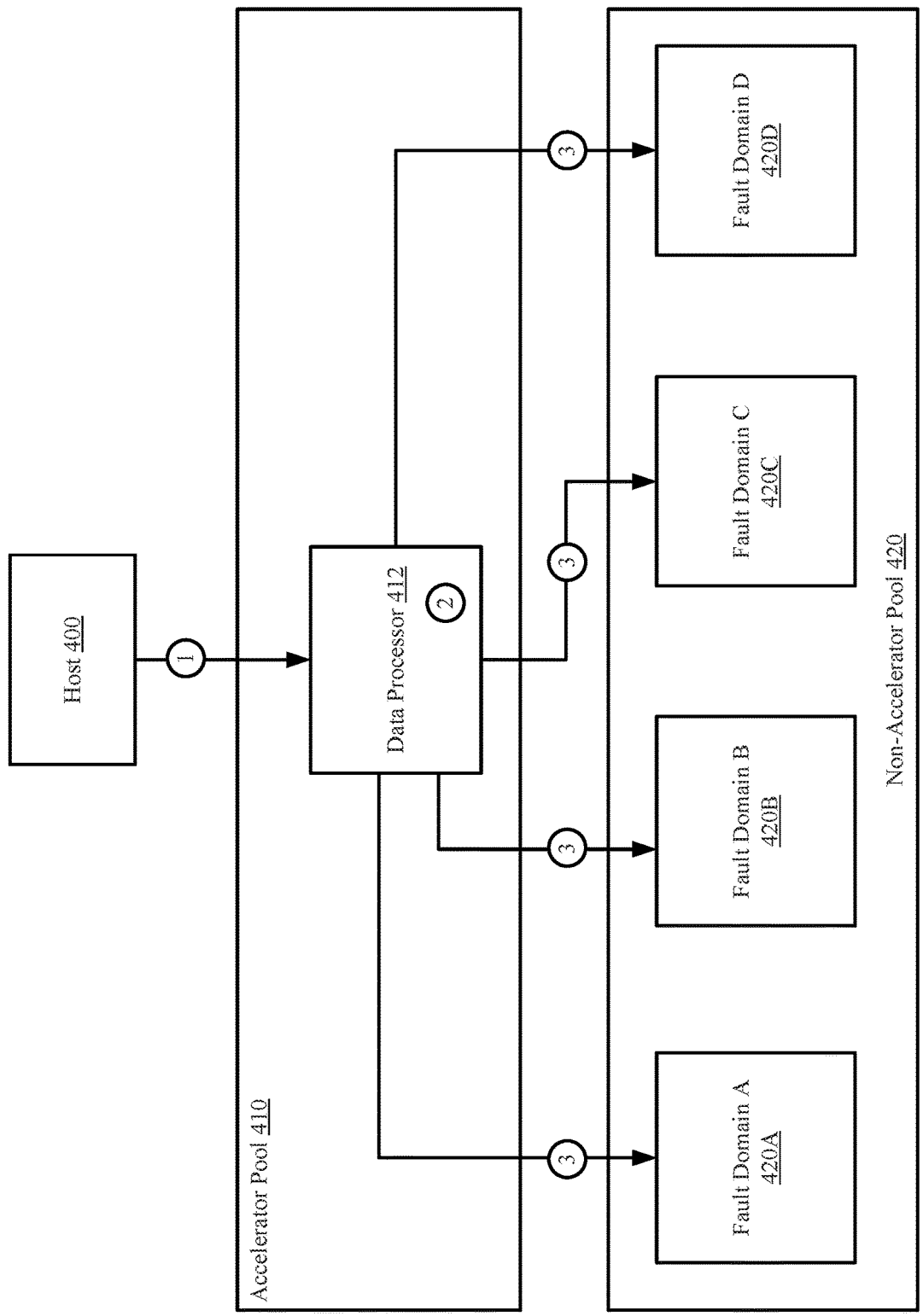
FIGS. 4A-4C show an example in accordance with one or more embodiments of the invention.
Figure 4B:
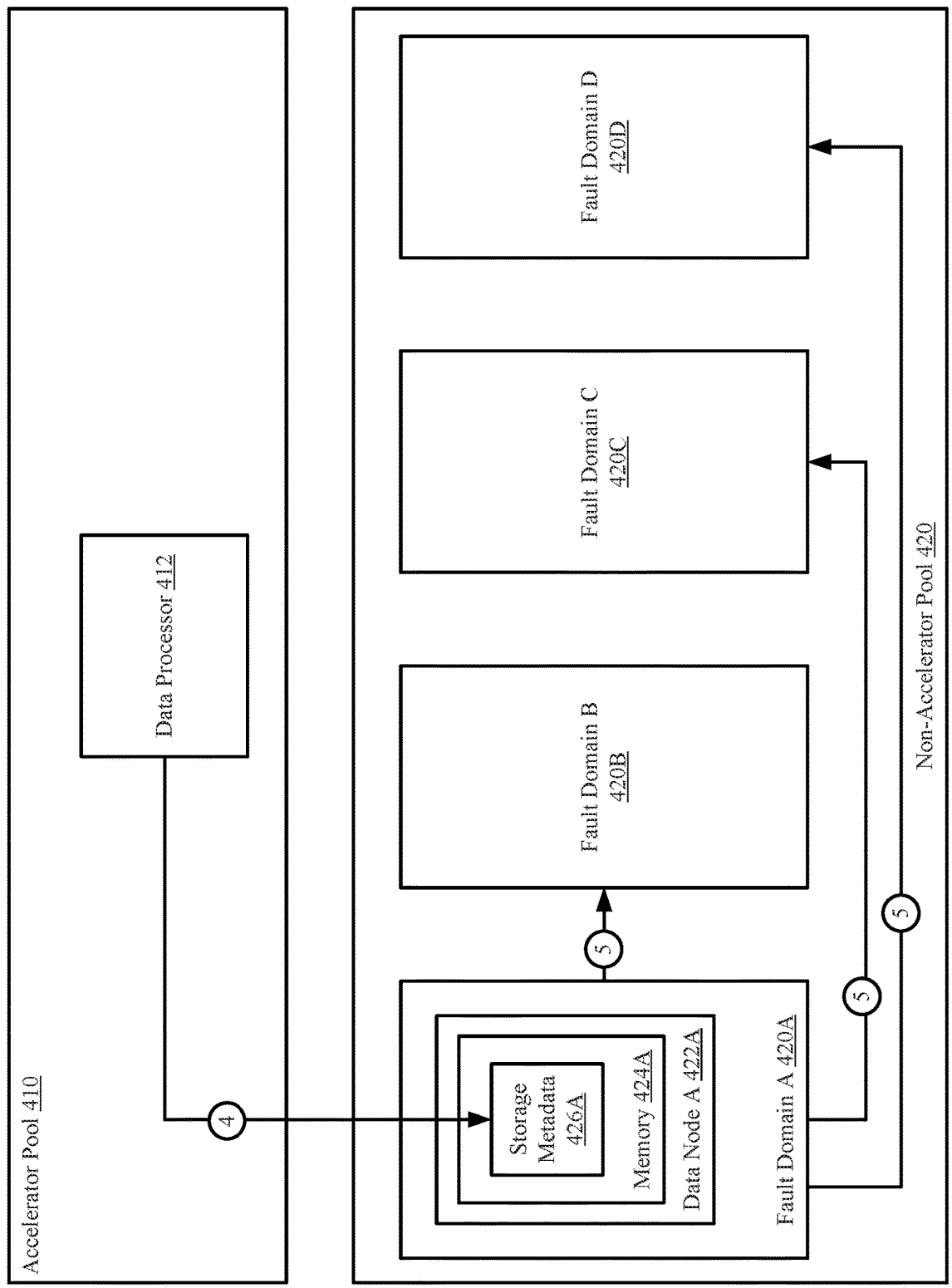
Figure 4C:
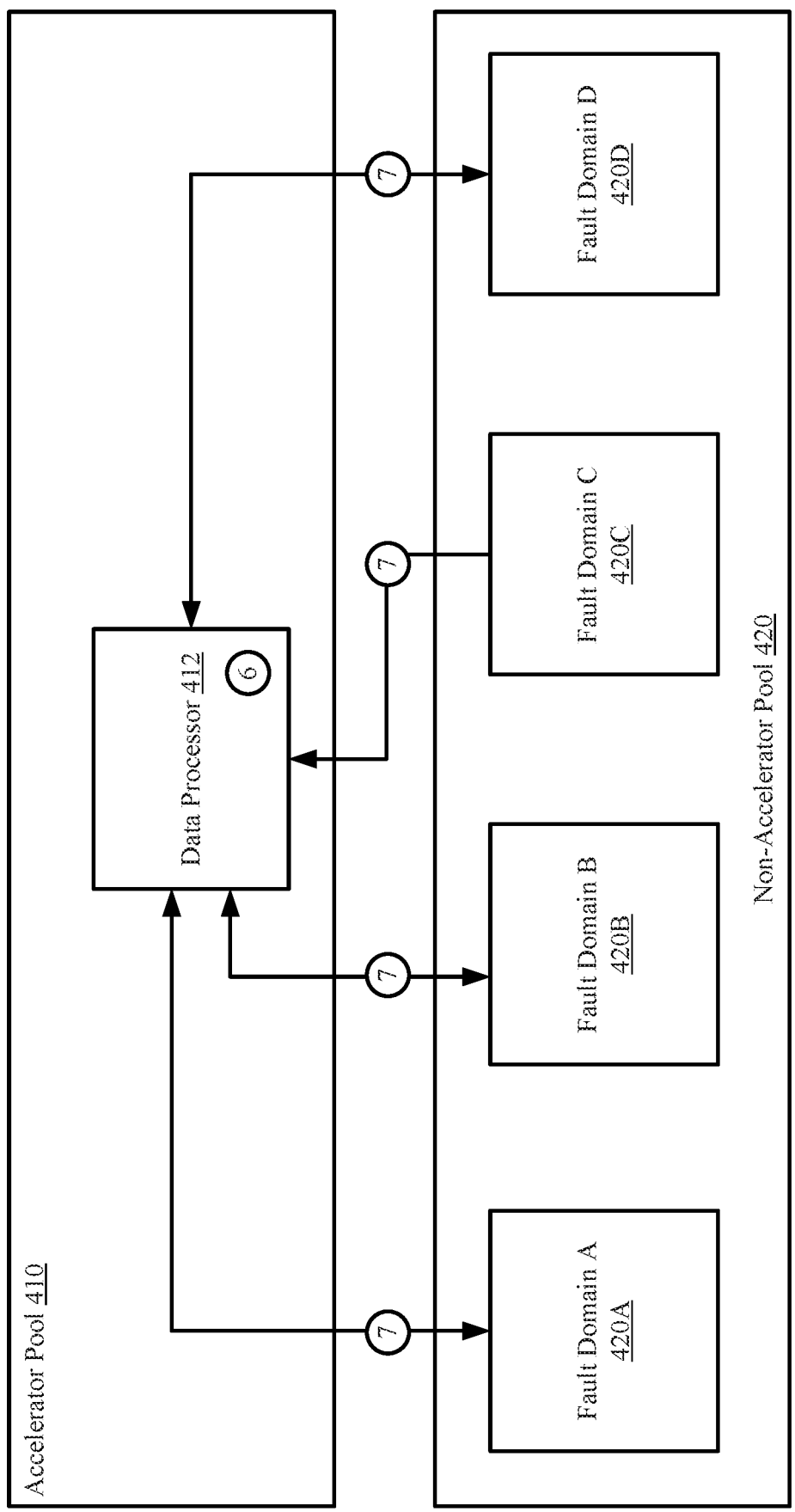

The following section describes an example. The example is not intended to limit the invention. The example is illustrated in FIGS. 4A-4C. Turning to the example, consider a scenario in which a data cluster obtains data from a host. The data may be a file. The host may request the file be stored in the data cluster using a 3:1 erasure coding procedure. FIG. 4A shows a diagram a system in accordance with one or more embodiments of the invention. The host (400) sends the request to a data processor (412) of an accelerator pool (410) [1].

The data processor (412) performs the method of FIG. 3A to store the obtained file. Specifically, the data processor performs an erasure coding on the file [2]. In this example, assume that the erasure coding procedure includes implementing RAID-3. The result of the erasure coding procedure is a group of three data chunks and a parity chunk. The data chunks and parity chunk may further go under a deduplication operation to obtain deduplicated data chunks. Because this file is not part of a previously-stored file, all three data chunks are deduplicated data chunks and, as such, all need to be stored in the non-accelerator pool.

The deduplicated data chunks and the parity chunk are stored in the non-accelerator pool (420) [3]. Specifically, each of the three deduplicated data chunk and the parity chunk is stored in a unique fault domain. In other words, a first deduplicated data chunk is stored in fault domain A (420A), a second deduplicated data chunk is stored in fault domain B (420B), a third deduplicated data chunk is stored in fault domain C (420C), and the parity chunk is stored in fault domain D (420D).

In addition to storing the deduplicated data chunks and the parity chunks, the data processor generates a storage metadata slice entry in storage metadata stored in the accelerator pool. A unique identifier of each deduplicated data chunk and parity chunk is stored in storage metadata slice entry.

FIG. 4B shows a diagram of the example system. A copy of the storage metadata is sent to a data node (422A) of fault domain A (420A) [4]. The data node (422A) may store the copy of the storage metadata (426A) in memory (424A) of the data node (422A). Further, the data node (422A) may distribute a copy of the storage metadata (426A) to the other fault domains (420B, 420C, 420D) [5].

At a later point in time, the data processor identifies a storage metadata failure. FIG. 4C shows a third diagram of the system. The storage metadata failure may be identified by the data processor (412) attempting to access the storage metadata in the accelerator pool (410) and failing to do so [6]. The data processor may, in response to the identification, request each fault domain (420A, 420B, 420C, 420D) to send a portion of the storage metadata stored in the respective fault domain [7]. A portion of the storage metadata of a fault domain may be a portion of metadata that specifies the data stored in the fault domain. The fault domains (420A, 420B, 420C, 420D) may each send their respective portions of storage metadata. The data processor (412) then reconstructs the storage metadata using the storage metadata obtained from the fault domains (420A, 420B, 420C, 420C).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of performing data storage in a data cluster. The efficiency is improved by implementing erasure coding procedures and performing deduplication on data. The erasure coding procedure includes generating additional portions of data (e.g., parity chunks) associated with the deduplicated data. The deduplicated data and the additional portions of data may be stored across multiple fault domains. In this manner, if any number of fault domains become inaccessible prior to recovery of data, the data stored in the remaining fault domains may be used to recreate the backup. This method may replace the need to store multiple copies of the same data across the fault domains, thus reducing the amount of storage used for storing data while maintaining policies in the event of fault domain failures.

Further, embodiments of the invention improve the data storage by maintaining storage metadata of the deduplicated data and additional portions of data. The storage metadata may specify a storage location of the storage metadata. The storage metadata may be stored not only in an accelerator pool in which the deduplicated data was generated but additionally in the fault domains in which the data is stored. In this manner, if the storage metadata stored in the accelerator pool becomes inaccessible, the storage metadata may be recovered using the fault domains.

Thus, embodiments of the invention may address the problem of ensuring access to erasure coded data in a distributed computing environment.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
   obtaining the data from a host;
   applying an erasure coding procedure to the data to obtain a plurality of data chunks and at least one parity chunk;
   deduplicating the plurality of data chunks to obtain a plurality of deduplicated data chunks;
   generating storage metadata associated with the plurality of deduplicated data chunks and the at least one parity chunk;
   storing the storage metadata in an accelerator pool, wherein the accelerator pool comprises a plurality of high performance nodes;
   storing, across a plurality of fault domains, the plurality of deduplicated data chunks and the at least one parity chunks,
      wherein a non-accelerator pool comprises a plurality of data nodes that provide lower storage performance than the plurality of high performance nodes,
      wherein the plurality of fault domains is implemented using the plurality of data nodes;

initiating storage metadata distribution on the storage metadata across the plurality of fault domains;
after initiating the storage metadata distribution, identifying a storage metadata failure of the storage metadata in the accelerator pool;
in response to the storage metadata failure, sending a first storage metadata request to a first fault domain of the plurality of fault domains for a first portion of a copy of the storage metadata;
sending a second storage metadata request to a second fault domain of the plurality of fault domains for a second portion of the copy of the storage metadata;
obtaining, in response to the first storage metadata request, the first portion from the first fault domain,
obtaining, in response to the second metadata storage request, the second portion from the second fault domain; and
performing a storage metadata reconstruction of storage metadata on the accelerator pool using the first portion and the second portion.

2. The method of claim 1, wherein each deduplicated data chunk of the plurality of data chunks is stored in a unique fault domain of the plurality of fault domains, and wherein a copy of the storage metadata is stored in each fault domain of the plurality of fault domains.

3. The method of claim 1,
wherein storing the plurality of deduplicated data chunks and the at least one parity chunk comprises: storing a deduplicated data chunk of the plurality of deduplicated data chunks on a first data node in a fault domain of the plurality of fault domains,
wherein initiating storage metadata distribution on the storage metadata across the plurality of fault domains comprises: initiating storage of a copy of the storage metadata on a second data node in the fault domain.

4. The method of claim 1, wherein the storage metadata includes at least location information of: at least one of the plurality of deduplicated data chunks and of the at least one parity chunk.

5. A non-transitory computer readable medium comprising computer readable program code, which when executed by a computer processor enables the computer processor to perform a method for managing data, the method comprising:
obtaining the data from a host;
applying an erasure coding procedure to the data to obtain a plurality of data chunks and at least one parity chunk;
deduplicating the plurality of data chunks to obtain a plurality of deduplicated data chunks;
generating storage metadata associated with the plurality of deduplicated data chunks and the at least one parity chunk;
storing the storage metadata in an accelerator pool, wherein the accelerator pool comprises a plurality of high performance nodes;
storing, across a plurality of fault domains, the plurality of deduplicated data chunks and the at least one parity chunk,
wherein a non-accelerator pool comprises a plurality of data nodes that provide lower storage performance than the plurality of high performance nodes,
wherein the plurality of fault domains is implemented using the plurality of data nodes;
initiating storage metadata distribution on the storage metadata across the plurality of fault domains;
after initiating the storage metadata distribution, identifying a storage metadata failure of the storage metadata in the accelerator pool;
in response to the storage metadata failure, sending a first storage metadata request to a first fault domain of the plurality of fault domains for a first portion of a copy of the storage metadata;
sending a second storage metadata request to a second fault domain of the plurality of fault domains for a second portion of the copy of the storage metadata;
obtaining, in response to the first storage metadata request, the first portion from the first fault domain,
obtaining, in response to the second storage metadata request, the second portion from the second fault domain; and
performing a storage metadata reconstruction of storage metadata on the accelerator pool using the first portion and the second portion.

6. The non-transitory computer readable medium of claim 5, wherein each deduplicated data chunk of the plurality of data chunks is stored in a unique fault domain of the plurality of fault domains, and wherein a copy of the storage metadata is stored in a second data node of each fault domain of the plurality of fault domains.

7. The non-transitory computer readable medium of claim 5,
wherein storing the plurality of deduplicated data chunks and the at least one parity chunk comprises: storing a deduplicated data chunk of the plurality of deduplicated data chunks on a first data node in a fault domain of the plurality of fault domains,
wherein initiating storage metadata distribution on the storage metadata across the plurality of fault domains comprises: initiating storage of a copy of the storage metadata on a second data node in the fault domain.

8. The non-transitory computer readable medium of claim 5, wherein the storage metadata includes at least location information of: at least one of the plurality of deduplicated data chunks and of the at least one parity chunk.

9. A data cluster, comprising:
a host;
a non-accelerator pool comprising a plurality of low performance nodes wherein a plurality of fault domains is implemented using the plurality of low performance nodes; and
an accelerator pool comprising a plurality of data nodes, wherein the plurality of data nodes provides higher storage performance than the plurality of low performance nodes,
wherein a data node of the plurality of data nodes comprises a processor and memory comprising instructions, which when executed by the processor perform a method, the method comprising:
obtaining data from the host;
applying an erasure coding procedure to the data to obtain a plurality of data chunks and at least one parity chunk;
deduplicating the plurality of data chunks to obtain a plurality of deduplicated data chunks;
generating storage metadata associated with the plurality of deduplicated data chunks and the at least one parity chunk;
storing the storage metadata in the accelerator pool;
storing, across the plurality of fault domains, the plurality of deduplicated data chunks and the at least one parity chunk;

initiating storage metadata distribution on the storage metadata across the plurality of fault domains;

after initiating the storage metadata distribution, identifying a storage metadata failure of the storage metadata in the accelerator pool;

in response to the storage metadata failure, sending a first storage metadata request to a first fault domain of the plurality of fault domains for a first portion of a copy of the storage metadata;

sending a second storage metadata request to a second fault domain of the plurality of fault domains for a second portion of the copy of the storage metadata;

obtaining, in response to the first storage metadata request, the first portion from the first fault domain, obtaining, in response to the second storage metadata request, the second portion from the second fault domain; and performing a storage metadata reconstruction of storage metadata on the accelerator pool using the first portion and the second portion.

10. The data cluster of claim 9, wherein storing the plurality of deduplicated data chunks and the at least one parity chunk comprises: storing a deduplicated data chunk of the plurality of deduplicated data chunks on a first data node in a fault domain of the plurality of fault domains, wherein initiating storage metadata distribution on the storage metadata across the plurality of fault domains comprises: initiating storage of a copy of the storage metadata on a second data node in the fault domain.

* * * * *